United States Patent [19]

Zinsmeyer

[11] Patent Number: 5,009,079
[45] Date of Patent: Apr. 23, 1991

[54] REFRIGERANT FLOW CONTROL DEVICE
[75] Inventor: Thomas M. Zinsmeyer, Pennellville, N.Y.
[73] Assignee: Carrier Corporation, Syracuse, N.Y.
[21] Appl. No.: 457,228
[22] Filed: Dec. 26, 1989
[51] Int. Cl.⁵ .............................................. F25B 41/04
[52] U.S. Cl. .................................... 62/218; 137/192; 137/399
[58] Field of Search ..................... 137/192, 399, 432; 62/218

[56] References Cited

U.S. PATENT DOCUMENTS

| | | | |
|---|---|---|---|
| 47,304 | 4/1865 | Hogg | 137/192 X |
| 130,490 | 8/1872 | Dick | 137/192 X |
| 921,865 | 5/1909 | Miller et al. | 137/192 |
| 1,766,966 | 6/1930 | Walsh | 137/192 |
| 2,299,360 | 10/1942 | Tharp | 137/432 X |
| 2,613,922 | 10/1952 | Gatchet | 137/192 X |
| 3,399,544 | 9/1968 | Osborne | 62/218 |

FOREIGN PATENT DOCUMENTS 73678 of 1894 Fed. Rep. of Germany ...... 137/192

Primary Examiner—William E. Tapolcai

[57] ABSTRACT

A simple flow control device is provided in a condensate drain pipe to prevent the flow of refrigerant vapor therethrough and to regulate the flow of liquid refrigerant as a function of the level of accumulated liquid refrigerant in the drain pipe. The only moving part is a float device that rides up on a cylindrical valve body in response to the level of liquid refrigerant to thereby expose slots in the valve body which allow for the flow of liquid refrigerant to the refrigerant return line to the cooler.

13 Claims, 3 Drawing Sheets

REFRIGERANT FLOW CONTROL DEVICE

BACKGROUND OF THE INVENTION

This invention relates generally to refrigeration systems and, more particularly, to a device for controlling the flow of refrigerant from the high to the low side of the system.

In a centrifugal chiller refrigeration system, liquid refrigerant flows to a lower sump portion of a condenser from which it then must be metered to a cooler as part of the refrigeration cycle. A common approach for accomplishing this metering function has been with the use of a float bulb connected to a guillotine valve. Such an apparatus allows the refrigerant flow to be responsive to the level of liquid refrigerant in the sump and also provides a liquid seal to prevent the flow of gaseous refrigerant to the cooler. Typical of such devices are those shown in U.S. Pat. Nos. 3,365,899 and 3,399,544 assigned to the assignee of the present invention. Although these devices are effective in operation, they are relatively complicated and expensive because of the close tolerances that are required. For the same reason, their reliability is also sometimes less than desired.

Because of the above-mentioned complications, a more prevalent approach in the industry has been the use of a simple fixed orifice to accomplish the metering function. With no moving parts, this design is simple, reliable and effective for the purpose intended. Since the orifice must be sized for a 100 percent load, it is relatively large in size. If the system is operating at part load, then the large sized orifice allows not only liquid refrigerant to pass, but also the gaseous refrigerant. Although this refrigerant gas flow represents a parasitic loss in the system, it has heretofore been tolerated for the sake of simplicity and reliability.

Heretofore the preferred refrigerant for centrifugal chiller refrigeration applications has been R-11. But, because of possible detriment to the environment, there is a movement in the refrigeration industry to use alternative refrigerants in such systems. One of these alternatives is R-22, which operates at higher pressures and is therefore a much more dense refrigerant (i.e. by a factor of 8) and one which provides a substantially reduced refrigeration cycle efficiency. The use of the higher density refrigerant thus becomes significant in a number of aspects with regard to the gas bypass that has been tolerated as discussed hereinabove. Because of the reduced cycle efficiency, the parasitic losses become more critical. Secondly, because the refrigerant is substantially more dense, a given volume of gaseous refrigerant that is bypassed represents a proportionately greater loss. Finally, because of the inherent need for a high pressure machine (i.e. 300 PSI versus 15 PSI), a given volume loss represents, again, a greater proportionate loss than with a low pressure system. For these reasons, the parasitic losses that have heretofore been tolerated are no longer acceptable. But, on the other hand, it is not desirable to return to the relatively complicated types of float bulb valves that were previously used.

It is therefore an object of the present invention to provide an improved refrigerant flow metering apparatus for a centrifugal chiller system.

Another object of the present invention is the provision for a refrigerant flow control device which operates to prevent the bypassing of refrigerant gas.

Yet another object of the present invention is the provision in a centrifugal chiller system for a refrigerant flow control device which is simple and reliable in construction.

Yet another object of the present invention is the provision in a centrifugal chiller system for a refrigerant flow control apparatus which is economical to manufacture and simple and effective in use.

These objects and other features and advantages become more readily apparent upon reference to the following description when taken in conjunction with the appended drawings.

SUMMARY OF THE INVENTION

Briefly, in accordance with one aspect of the invention, a standpipe extends upwardly from a lower portion of the condenser sump and a plurality of openings are symmetrically provided on the sides of the standpipe, near the lower end thereof. A float is slideably disposed over the standpipe so as to cover the openings when the liquid level of the refrigerant is below a predetermined level, and when the refrigerant rises above a predetermined level, the float is caused to rise so as to uncover the openings and allow liquid refrigerant to flow therethrough to a cooler below. In this way, the refrigerant flow control is simply and effectively made responsive to the level of liquid refrigerant in the sump while, at the same time, preventing any bypass of refrigerant gas through the openings.

By another aspect of the invention, the float device is so shaped at the surface which interfaces with the standpipe that the float is prevented from hanging up in a fixed position on the standpipe because of frictional resistance. More specifically, the float element is undercut along most of its length such that it contacts the standpipe only at the top and bottom portions thereof.

By yet another aspect of the invention, the bottom portion of the float is so shaped as to prevent the float from sticking to a portion of the standpipe. The float includes a cylindrical sleeve with the bottom portion beveled in order to reduce the surface contact with that portion of the standpipe on which it rests.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

Referring now to FIGS. 1 and 2, the invention is shown generally at 10 as installed in the condensate drain pipe 11 of a condenser 12 having a plurality of tubes 13 mounted therein for purposes of cooling the refrigerant and causing it to flow to the bottom of the condenser 12 and out the condensate drain pipe 11, from which it then flows to a cooler (not shown) by way of the flow control apparatus to be described herein.

Figure 2:
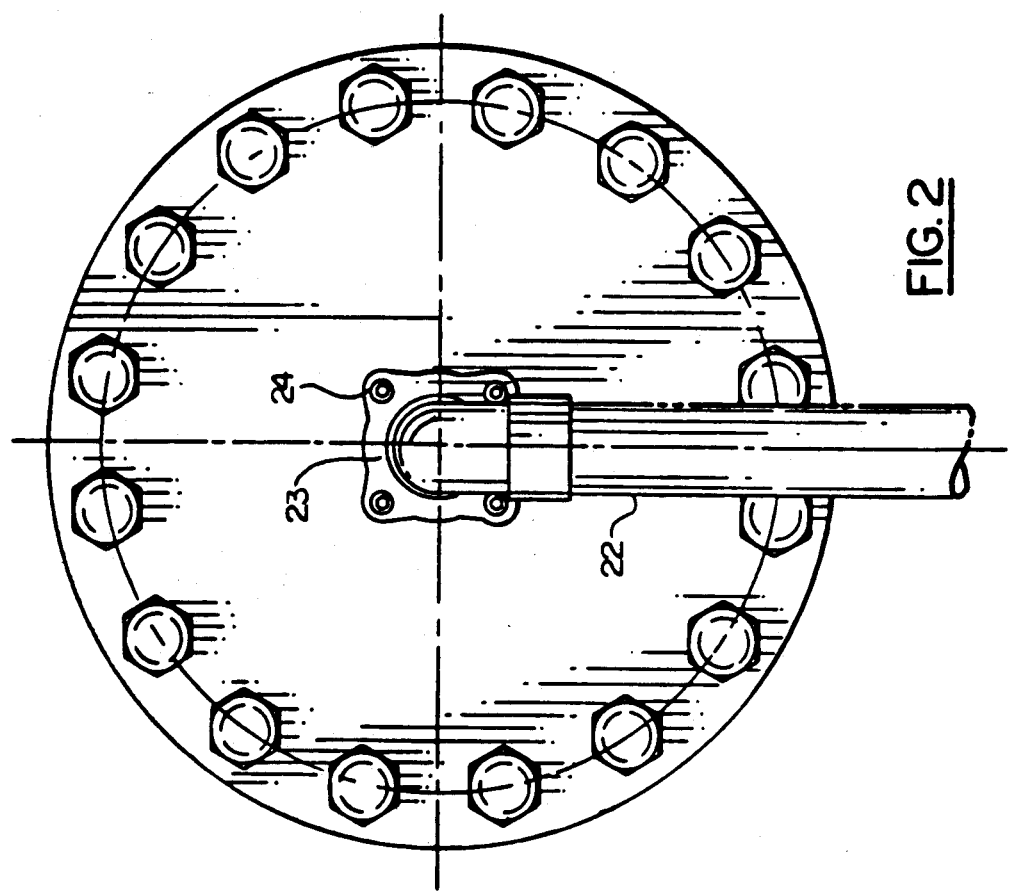
FIG. 2 is a bottom view of the flow control apparatus portion of the invention.

The condensate drain pipe 11 extends downwardly from the lower portion of the condenser 12 and has attached to the periphery of its lower end, by welding or the like, a mounting flange 14. Attached to the mounting flange 14 is an access plate 16, which is removably secured to the mounting flange 14 by a plurality of bolts 17 and nuts 18. The flow control device of the present invention is attached to the top side 19 of the access plate in a manner to be described hereinafter, and operates to control the flow of liquid refrigerant passing through the condensate drain pipe 11 and through a central opening 21 of the access plate 16, where it is then discharged to a refrigerant return line 22. The refrigerant return line 22 is fluidly connected to the central opening 21 by way of a mounting flange 23 and a plurality of bolts 24, as shown in FIG. 2. Its other end is fluidly connected to the evaporator, or cooler, in a conventional manner.

Figure 1:
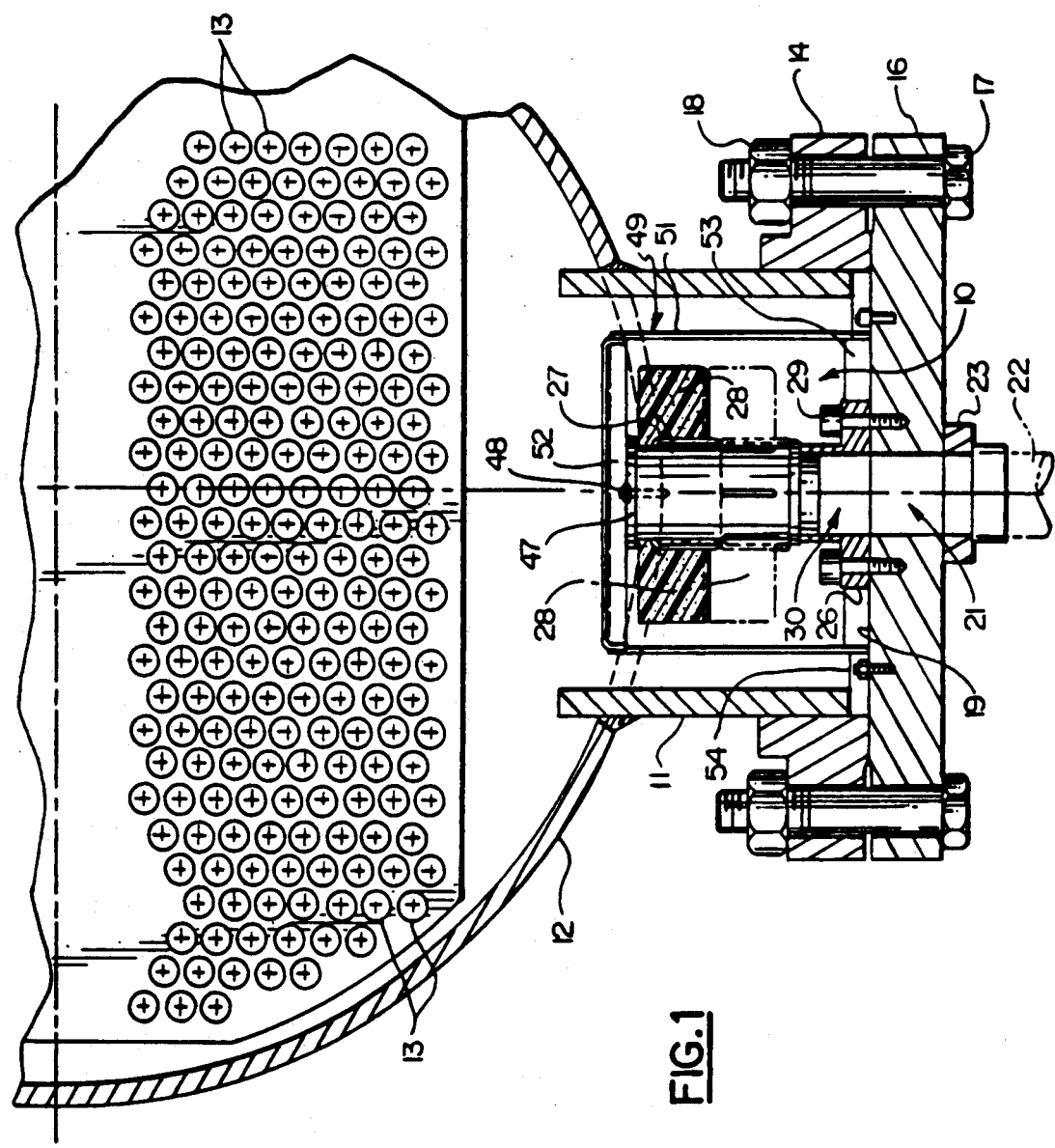
FIG. 1 is a partial front view of a condenser with the flow control apparatus of the present invention incorporated therein.
Figure 3:
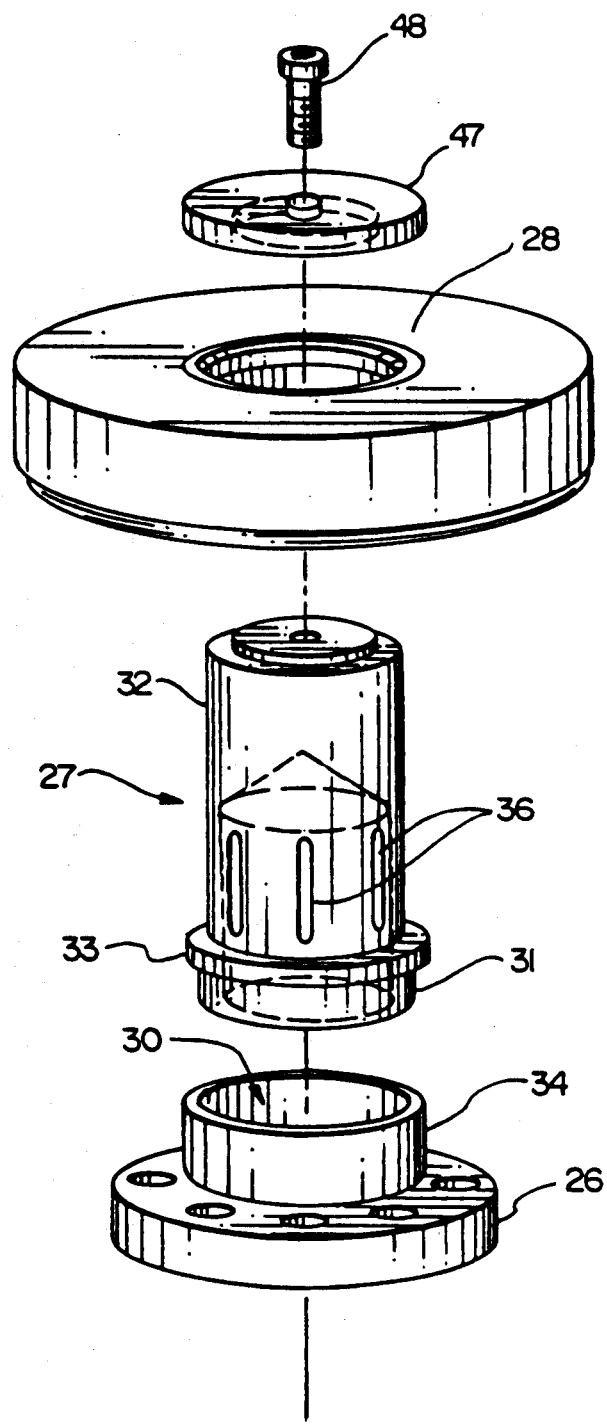
FIG. 3 is an exploded view of the flow control apparatus portion of the invention.

Referring now to FIG. 3, the flow control device is shown to include a base 26, a valve body 27, and a float device 28. These elements are shown in the assembled positions in FIG. 1 with the base 26 being attached to the access plate top side 19 by fasteners 29, with its cylindrical central opening 31 coinciding with that 21 of the access plate 16. This base structure 26 simply provides a means of mounting the valve body 27 to the access plate 16. The valve body 27 includes a lower cylindrical section 31, an upper cylindrical 32, and an intermediate flange 33. In its installed position, the lower cylindrical section 31 is slideably disposed in the base central opening 30, with the intermediate flange 33 resting on the top surface of the cylindrical upper portion 34 of the base 26 as shown in FIG. 1.

Formed in the upper cylindrical section 32 of the valve body 27 are a plurality of circumferentially spaced, elongate slots 36, whose axial positions and lengths are predetermined so as to bring about the desired performance characteristics when the float device device 28 operates with conjunction therewith.

Figure 4:
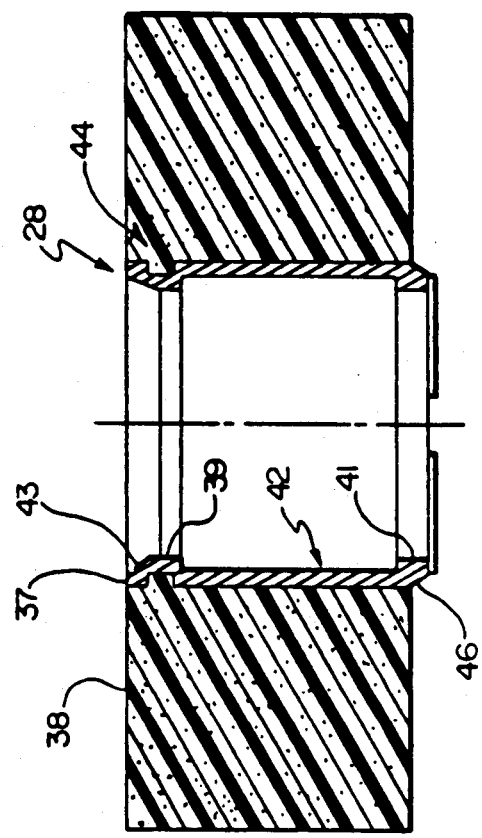
FIG. 4 is a sectional view of the float device portion of the invention.

Referring to FIG. 4, the float device 28 comprises a cylindrical sleeve 37 with a toroidal shaped collar 38 fixedly mounted to its periphery. The sleeve 37 has upper and lower contact surfaces 39 and 41, which are of a reduced, and closely controlled, diameter, such that when the sleeve 37 is slideably mounted on the valve body upper cylindrical 32, there is little friction between the mating elements. Between the upper and lower contact surfaces 39 and 41, there is a clearance space 42 which ensures that frictional contact is not established between the upper and lower contact surfaces 39 and 41. Further, a beveled portion 43 is provided at the upper end of the sleeve 37 in order to further prevent the hanging up of the sleeve 37 as it freely slides on the valve body upper cylindrical section 32. The sleeve 37 is preferably made of the same material as the valve body 27. A material that has been found to be suitable is a half hard, XB40-8 (copper alloy C36000).

Rigidly secured to the outer periphery of the sleeve 37 is the collar 38 which is made of a flotation material that is resistant to chemical reaction with the refrigerant. A material that has been found to be suitable for this purpose is a syntactic foam composed of a slurry of micro balls adhesively held together by epoxy, with a density of 21-25 lbs/ft$^3$. The collar 38 is preferably molded to the outer periphery of the sleeve 37 with a peripheral indent 44 being provided on the sleeve 37 in order to prevent any axial relative movement between the two elements. The height of the collar 38 is slightly less than that of the sleeve 37, such that the sleeve extends downwardly further than the collar 38. The outer side of the sleeve 37 is beveled at 46 in order to reduce the contact surface area between the sleeve 37 and the top of the intermediate sleeve 33 on the valve body 27.

The float device 28 is designed to slideably move between the closed position where the sleeve 37 rests on the valve body intermediate portion 33 and between the open position where the sleeve 37 moves to the top of the valve body cylindrical section 32 as shown in FIG. 1. A stop plate 47 is secured by way of fastener 48 to the top end of the valve body upper cylindrical section 32 so as to limit the upward movement of the flow device 28 to that shown in FIG. 1. Recognizing that solid particles may tend to be immersed in the refrigerant passing through the condensate drain pipe 11, a protective screen 49 is provided to surround and protect the flow control device. The protective screen device 49 comprises a cylindrical screen portion 51 secured between solid end portions 52 and 53, which are formed of a suitable material such as sheet metal. The protective screen 49 is mounted to the access plate top side 19 by a plurality of bolts 54.

In operation, the flow control device functions as follows. When the level of the liquid refrigerant in the condensate drain pipe 11 is no higher than the bottom of the slots 36, the float device 28 will remain in the fully closed (i.e., the lowermost position as shown in FIG. 1), and neither liquid refrigerant nor refrigerant vapor will be allowed to pass to the refrigerant return line 22. As the level of the liquid refrigerant increases to the point that it is above the lower portion of the slots 36, it will then be in contact with the lower surface of the collar 38. When the upward force of the buoyancy is sufficient to overcome the weight of the float device 28, it will rise to uncover the slots 36 so that liquid refrigerant can pass through the slots 36, through the openings 30 and 21 and finally to the refrigerant return line 22. It will be recognized, however, that the level of liquid refrigerant in the condensate drain pipe 11 will always be above the level of the exposed slots when the valve is open, such that refrigerant vapor will be prevented from entering the slots 36. In this way, only liquid refrigerant will pass to the condensate drain pipe, and the volume of flow will be automatically regulated in response to the level of liquid refrigerant in the condensate drain pipe 11.

While the present invention has been disclosed with particular reference to a preferred embodiment, the concepts of this invention are readily adaptable to other embodiments, and those skilled in the art may vary the structure thereof without departing from the essential spirit of the present invention.

What is claimed is:

1. An improved refrigerant flow control device of the type having a float which is responsive to the liquid level of refrigerant in a condenser sump to control the flow of refrigerant from the sump comprising:

a standpipe extending upwardly from a lower portion of the sump, said standpipe having its upper end closed and having near its lower end at least one opening formed to provide fluid communication from the lower portion of the sump to a refrigerant return line below; and a float device slideably disposed on said standpipe in such a way that when the liquid level of refrigerant in the sump is below a predetermined level, said float device is caused to rest at a vertical height on said standpipe such that it covers said at least one opening, and when the liquid level of refrigerant rises above said predetermined level, said float device is caused to slide upwardly to uncover said at least one opening and allow liquid refrigerant to flow from the sump; wherein said float device has an undercut portion surrounding said standpipe such that the amount of surface contact between said float device and said standpipe is reduced.

2. An improved refrigerant flow control device as set forth in claim 1 wherein said standpipe is of a cylindrical shape.

3. An improved refrigerant flow control device as set forth in claim 1 wherein said at least one opening comprises an elongate slot formed in the side of said standpipe.

4. An improved refrigerant flow control device as set forth in claim 1 wherein said at least one opening comprises a plurality of openings symmetrically located on the sides of said standpipe.

5. An improved refrigerant flow control device as set forth in claim 1 wherein said float device is generally toroidally shaped with a cylindrical cavity at its center.

6. An improved refrigerant flow control device a set forth in claim 1 wherein said flow device includes a cylindrical sleeve with a beveled portion at one end thereof to reduce the surface contact between said sleeve and a portion of a said standpipe on which it rests.

7. An improved refrigerant flow control device as set forth in claim 1 wherein said float device undercut portion is so disposed that said float device engages said standpipe only at top and bottom portions of said float device.

8. An improved refrigerant flow control device of the type having a float which rises with the level of liquid refrigerant in the sump of a condenser to control the flow of refrigerant from a discharge opening in the bottom of the sump comprising:

a standpipe extending upwardly from the discharge opening and having at least one side opening in a lower portion thereof, said side opening fluidly communicating with said discharge opening, and a float element mounted on said standpipe and vertically movable thereon between a lower position wherein said float element covers said side discharge opening to prevent the flow of refrigerant therethrough and increasingly higher positions wherein said flow element uncovers increasingly greater portions of said opening to allow increasingly greater flow of refrigerant therethrough, wherein said float element has an undercut portion surrounding said standpipe such that the amount of surface contact between said float element and said standpipe is reduced.

9. An improved refrigerant flow control device as set forth in claim 8 wherein said standpipe is cylindrical in form.

10. An improved refrigerant flow control device as set forth in claim 8 wherein said at least one side opening comprises a vertical slot formed in the side of said standpipe.

11. An improved refrigerant flow control device as set forth in claim 9 wherein said float element is generally toroidal in form.

12. An improved refrigerant flow control device as set forth in claim 8 wherein said float element is composed of a slurry of microballs adhesively held together by epoxy.

13. An improved refrigerant flow control device as set forth in claim 8 wherein said refrigerant comprises R-22.

* * * * *